United States Patent
Ferianz et al.

(10) Patent No.: US 6,870,911 B2
(45) Date of Patent: Mar. 22, 2005

(54) TRANSCEIVER

(75) Inventors: Thomas Ferianz, Glanegg (AT);
Dietmar Straeussnigg, Villach (AT);
Peter Singeri, Villach (AT); Herbert Zojer, Villach (AT)

(73) Assignee: Infineon Technologies AG, Munich (DE)

( * ) Notice: Subject to any disclaimer, the term of this patent is extended or adjusted under 35 U.S.C. 154(b) by 450 days.

(21) Appl. No.: 09/998,003

(22) Filed: Nov. 29, 2001

(65) Prior Publication Data

US 2002/0086668 A1 Jul. 4, 2002

(30) Foreign Application Priority Data

Nov. 29, 2000 (DE) ......................................... 100 59 135

(51) Int. Cl.$^7$ ............................................. H04M 11/00
(52) U.S. Cl. .................. 379/93.01; 379/93.09
(58) Field of Search .......................... 379/93.01, 93.05, 379/93.06, 93.08, 93.09; 375/219, 220, 222, 223

(56) References Cited

U.S. PATENT DOCUMENTS 6,477,249 B1 * 11/2002 Williamson et al. ..... 379/93.01
6,718,297 B1 * 4/2004 Pride et al. ............... 379/93.09

FOREIGN PATENT DOCUMENTS

| WO | WO 99/20027 | 4/1999 | |
|---|---|---|---|
| WO | WO 99/59322 | 11/1999 | .......... H04M/11/06 |

* cited by examiner

*Primary Examiner*—Minsun Oh Harvey
*Assistant Examiner*—Jefferey Harold
(74) *Attorney, Agent, or Firm*—Fish & Richardson P.C.

(57) ABSTRACT

Transceiver for transmitting and receiving voice and data signals includes a voice signal driver configured to operate in idle or working operating modes, during which it has a high or low output impedances respectively. A data signal driver drives an analog data transmission signal via a channel to the subscriber. A data reception circuit that converts a received analog data reception signal into digital reception data includes a multiplication circuit for multiplying the digital reception data by compensation coefficients selected to compensate for channel distortions, an identification circuit connected to the channel for providing an identification signal indicative of whether the subscriber terminal is on or off-hook, and a control circuit to select the operating mode in response to the identification signal and to determine compensation coefficients to compensate for a change in the channel resulting from a change in the output impedance of the voice signal driver.

17 Claims, 4 Drawing Sheets

TRANSCEIVER

FIELD OF INVENTION

The invention relates to a transceiver for transmitting and receiving voice and data signals, and in particular to an xDSL transceiver.

RELATED APPLICATIONS

This application claims the benefit of the priority date of German patent application 100 59 135.3 filed on Nov. 29, 2000, the contents of which are herein incorporated by reference.

FIG. 1 shows a subscriber connected via a telephone subscriber line to a transceiver situated within a switching center. The telephone subscriber line forms a transmission channel having specific transmission properties. At the subscriber end, a splitter for separating voice and data signals is provided at the transmission channel. The splitter comprises a low-pass filter TP and a high-pass filter HP. An analog telephone terminal is connected to the low-pass filter TP. The high-pass filter HP is connected via a line to a data modem of the subscriber. At the switching end, a transceiver for transmitting and receiving voice and data signals is connected to the transmission channel. When the terminal is taken off-hook by the subscriber, the impedance of the terminal changes and the resultant current rise in the transmission channel is detected by an identification circuit integrated in the transceiver. The identification circuit outputs an off-hook identification signal, with the result that the transceiver changes over from an idle operating mode (on-hook) to a working operating mode (off-mode). The change over in the operating mode causes the output impedance of the transceiver to change, with the result that the transmission properties of the transmission channel change. This can lead to errors in the data transmission between the transceiver and the subscriber modem. If the bit error rate exceeds a specific threshold value, according to the prior art a re-initialization and a renewed setup of the data transmission connection are effected after an interruption of the data transmission. Such a re-initialization may become necessary each time the handset is taken off-hook and each time the handset is placed on-hook. Since the initialization phase for the renewed setup of the data transmission connection requires a relatively long time, the duration of the data transmission is correspondingly delayed.

SUMMARY

The object of the present invention, therefore, is to provide a transceiver for data and voice signal transmission in which the data transmission does not lead to an interruption of the data transmission when the telephone handset is taken off-hook or placed on-hook by the subscriber.

The invention provides a transceiver for transmitting and receiving voice signals and data signals having a voice signal driver, which can be changed over between an idle operating mode and a working operating mode, the voice signal driver having a high output impedance in the idle operating mode and, in the working operating mode with a low output impedance, driving an analog transmission voice signal via a transmission channel to a subscriber terminal, a data signal driver for driving an analog data transmission signal via the transmission channel to the subscriber terminal, a data reception circuit, which converts a received analog data reception signal into digital reception data which are multiplied, by means of a multiplication circuit, by adjustable channel distortion compensation coefficients for the compensation of channel distortions of the transmission channel, and having an identification circuit connected to the transmission channel, which circuit identifies when the subscriber terminal is taken off-hook or placed on-hook and outputs an identification signal to a control circuit, which switches the voice signal driver into the working operating mode when the subscriber terminal is taken off-hook and into the idle operating mode when the subscriber terminal is placed on-hook, the control circuit setting the channel distortion compensation coefficients for the compensation of the transmission channel changed by the output impedance change of the voice signal driver.

The data signals are preferably modulated by a discrete multitone modulation method.

The control circuit preferably applies a first channel distortion compensation coefficient set to the multiplication circuit in the idle operating mode and a second channel distortion compensation coefficient set is preferably applied to the multiplication circuit in the working operating mode.

The channel distortion compensation coefficient sets preferably comprise a multiplicity of complex coefficients.

The channel distortion compensation coefficients of the second channel distortion compensation coefficient set are preferably higher or lower in each case by a constant complex value than the channel distortion compensation coefficients of the first channel distortion compensation coefficient set.

In a first embodiment of the transceiver according to the invention, the coefficients of the second channel distortion compensation coefficient set are calculated by a calculation unit as a function of the coefficients of the first channel distortion compensation coefficients within the control circuit.

In an alternative embodiment of the transceiver according to the invention, the coefficients of the two channel distortion compensation coefficient sets are stored in a memory unit within the control circuit The control circuit of the transceiver according to the invention preferably isolates the identification circuit from the transmission channel by opening a switching unit when the subscriber terminal is taken off-hook and switches the identification circuit to the transmission channel by closing the switching device when the subscriber terminal is placed on-hook.

The transmission channel is preferably formed by a two-wire telephone subscriber line.

In a preferred embodiment, the data signals are multi-tone-modulated signals.

Preferably, there are connected upstream of the data signal driver of the transceiver according to the invention a coder for coding the digital transmission data to be transmitted, an IFFT calculation circuit for IFFT transformation of the digital transmission data and a digital/analog converter for converting the digital transmission data into the analog data transmission signal.

Preferably, there are connected upstream of the multiplication circuit of the transceiver according to the invention an analogue/digital converter for converting the analog data reception signal into digital reception data, a digital FIR filter with adjustable coefficients and an FFT calculation circuit for FFT transformation of the filtered digital reception data.

Preferably, there are connected downstream of the multiplication circuit of the transceiver according to the invention a decision circuit and a decoder for decoding the equalized digital reception data.

The channel distortion compensation coefficients of the first channel distortion compensation coefficient set for the idle operating mode are preferably determined by measuring the transmission channel during an initialization operation for initializing the transceiver The transceiver according to the invention is preferably an xDSL transceiver, and in particular an ADSL transceiver.

A preferred embodiment of the transceiver according to the invention for transmitting and receiving voice and data signals is described below with reference to the accompanying figures for the purpose of explaining features that are essential to the invention.

DESCRIPTION

Figure 1:
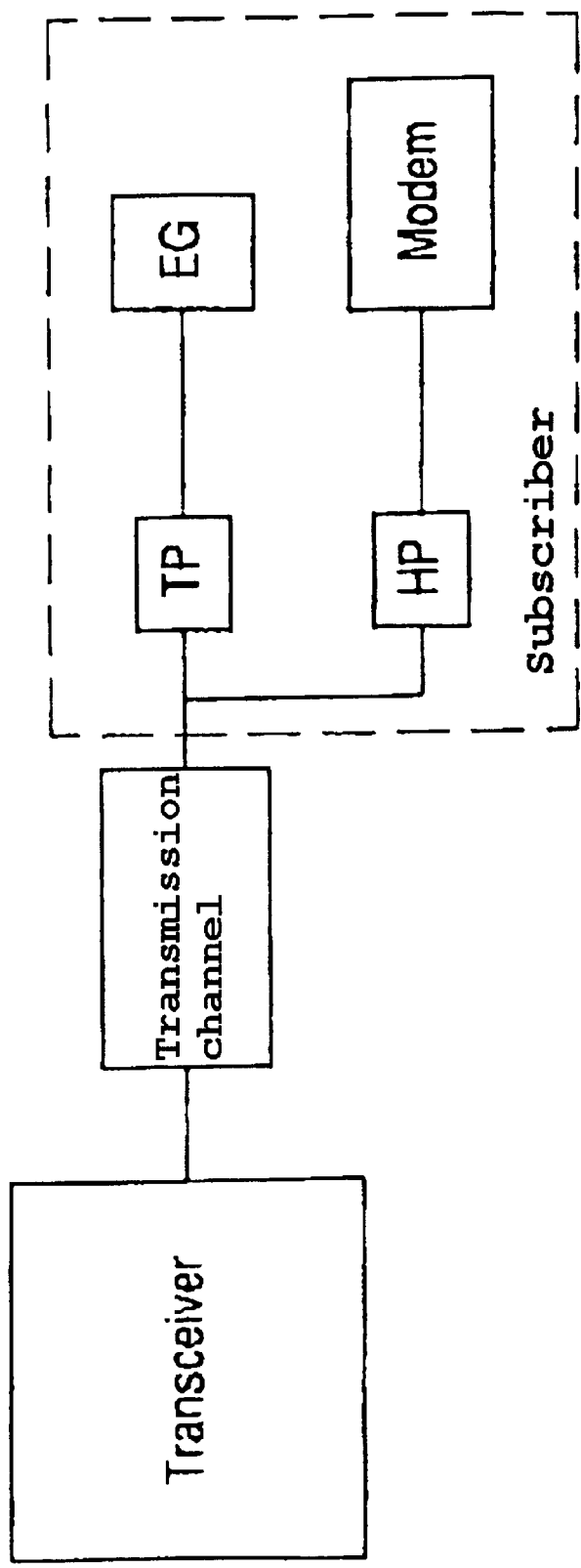
FIG. 1 shows a data transmission system with a transceiver according to the prior art.
Figure 2:
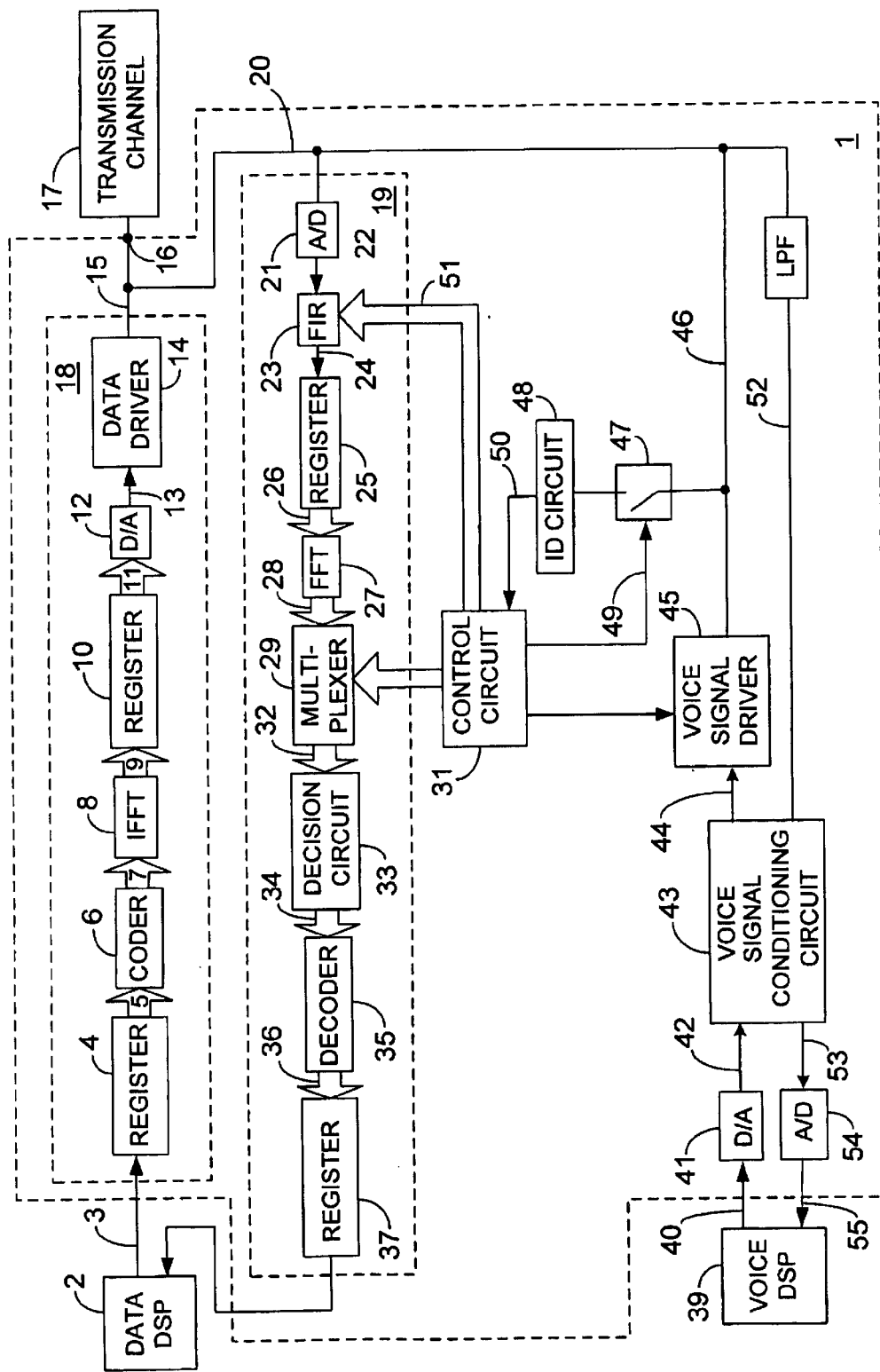
FIG. 2 shows a block diagram of a transceiver according to the invention.

FIG. 2 shows the circuitry construction of a preferred embodiment of a transceiver 1 according to the invention. The transceiver 1 receives from a data DSP 2, via a data line 3, the data to be transmitted and writes said data to a register 4. The data to be transmitted are combined into data blocks in the register 4 and forwarded to a coder 6 via data lines 5. The coder 6 codes the data present using an arbitrary coding method, for example a Reed-Solomon coding method. The coded transmission data are output from the coder 6 via parallel data lines 7 to a transformation calculation circuit 8. In the calculation circuit 8, the coded data to be transmitted are converted by means of inverse Fast Fourier transformation. The transformed data are written via data lines 9 to a further register 10 and buffer-stored there. The buffer-stored data are applied via data lines 11 to a digital/analog converter 12, which converts the transformed data into an analog data transmission signal. The transmission signal is composed of a multiplicity of sinusoidal signals, each sinusoidal transmission signal being modulated both in terms of amplitude and in terms of phase. Consequently, the transmission signal comprises a multiplicity of quadrature-amplitude-modulated transmission signals. The quadrature-amplitude-modulated transmission signal is applied via a line 13 to a data driver circuit 14 for signal level matching. The data driver circuit 14 amplifies the data transmission signal present and outputs it via a line 15 to a signal output connection 16 of the transceiver 1. The output connection 16 can be connected to an arbitrary transmission channel 17. The transmission channel 17 is preferably a two-wire telephone line with connected subscriber terminal.

The register 4, the coder 6, the transformation calculation circuit 8, the register 10, the digital/analog converter 12 and the analog data signal driver 14 form a data transmission signal path 18 within the transceiver 1 according to the invention.

In addition to the data transmission signal path 8 the transceiver 1 according to the invention contains a data reception signal path 19. A data signal received at the connection 16 pass via a line 20 to an analog/digital converter 21, which converts the received data signal into reception data. The converted reception data are fed via a line 22 to an FIR filter 23, which serves to shorten the impulse response of the entire transmission system. The FIR filter 23 is a transverse filter whose coefficients are adaptively adjustable. The provision of the FIR filter 23 shortens the transient process of the transceiver 1 when receiving data. The filtered reception data are output from the FIR filter 23 via a line 27 to a register 25, where they are buffer-stored. The buffer-stored reception data are output via parallel data lines 26 to an FFT calculation circuit 27, which carries out Fast Fourier transformation of the reception data present. In a preferred embodiment of the transceiver according to the invention, five hundred and twelve samples are present at the FFT calculation circuit 27 and are transformed into two hundred and fifty-six complex numerical values. The transformed reception data are output via parallel data lines 28 to a multiplication circuit 29. The multiplication circuit 29 multiplies the digital reception data present on the lines 28 by adjustable channel distortion compensation coefficients which are output by a control circuit 31 via parallel lines 30. The multiplied or weighted output data of the multiplication circuit 29 are output via data lines 32 to a QAM decision circuit 33. The received data are a multitone reception signal. On the output side, the decision circuit 33 is connected via data lines 34 to a decoder 35, which decodes the digital reception data and writes them via data lines 36 to a register 37. The register 37 outputs the buffer-stored decoded reception data via a data line 38 to the data DSP 2 for further processing of the data.

Via a line 40, a voice DSP 39 outputs the voice transmission data via a digital/analog converter 41 of the transceiver 1 according to the invention. The analog voice transmission signal is output from the digital/analog converter 41 via a line 42 to an analog signal conditioning stage 43, which applies the conditioned voice transmission signal via a line 44 to a voice signal driver 45. The voice signal driver 45 amplifies the voice transmission signal present in a working operating mode of the transceiver 1 and outputs the amplified voice transmission signal via a line 46 to the transmission channel connection 16 of the transceiver 1. The amplified voice transmission signal is transmitted via the transmission channel 17 to the analog subscriber terminal. The voice signal driver 45 is connected via a control line 47 to the control circuit 31. The control circuit 31 changes over the voice signal driver 45 between an idle operating mode and a working operating mode via the control line 47. The voice signal driver 45 has a high output impedance in the idle operating mode, while it has a low output impedance in the working operating mode. Furthermore, an identification circuit 48 is connected to the line 46 via a switching device 47. The identification circuit 48 identifies when the telephone handset is taken off-hook and placed on-hook by the subscriber through a current rise and current fall respectively, on the subscriber line 17. In the idle operating mode of the transceiver 1, the identification circuit 48 is connected to the line 46, i.e. the controllable switch 47 is kept in the closed position by the control circuit 31 via a control line 49. The identification circuit 48 identifies when the subscriber terminal is taken off-hook by the subscriber from a current rise on the line 46 and outputs a corresponding identification signal via a line 50 to the control circuit 31. When the subscriber terminal is taken off-hook, the control circuit 31 changes over the voice signal driver 45 to the working operating mode via the control line 47 and sets the channel distortion compensation coefficients, which are applied via the lines 30 to the multiplication circuit 29, for the compensation of the transmission channel changed by the output impedance change of the voice signal driver. Preferably, furthermore, the coefficients of the FIR filter 23 are adaptively set anew by the control circuit 31 via lines 51 in order to compensate for the output impedance change. Furthermore, in the working operating mode, the controllable switch 47 is opened by the control circuit 31 by the application of a control signal to the control line 49, with the result that the identification circuit 48 is isolated from the transmission channel 17.

The digital/analog converter 41, signal conditioning circuit 43a and the voice signal driver 45 form a voice transmission signal path within the transceiver 1 according to the invention.

In addition to the voice signal transmission path, the transceiver 1 has a voice reception signal path. The voice signal reception path has a low-pass filter 51a connected to the connection 16. The low-pass filter 51a filters out the low-frequency analog voice signal transmitted from the subscriber via the transmission channel 17 and outputs the filtered voice signal via a line 52 to the signal conditioning circuit 43. From the voice signal conditioning circuit 43, the analog conditioned voice reception signal passes via a line 53 to an analog/digital converter 54, which converts the analog voice reception signal into digital voice reception data and outputs them via a line 55 to the voice DSP 39.

Figure 3:
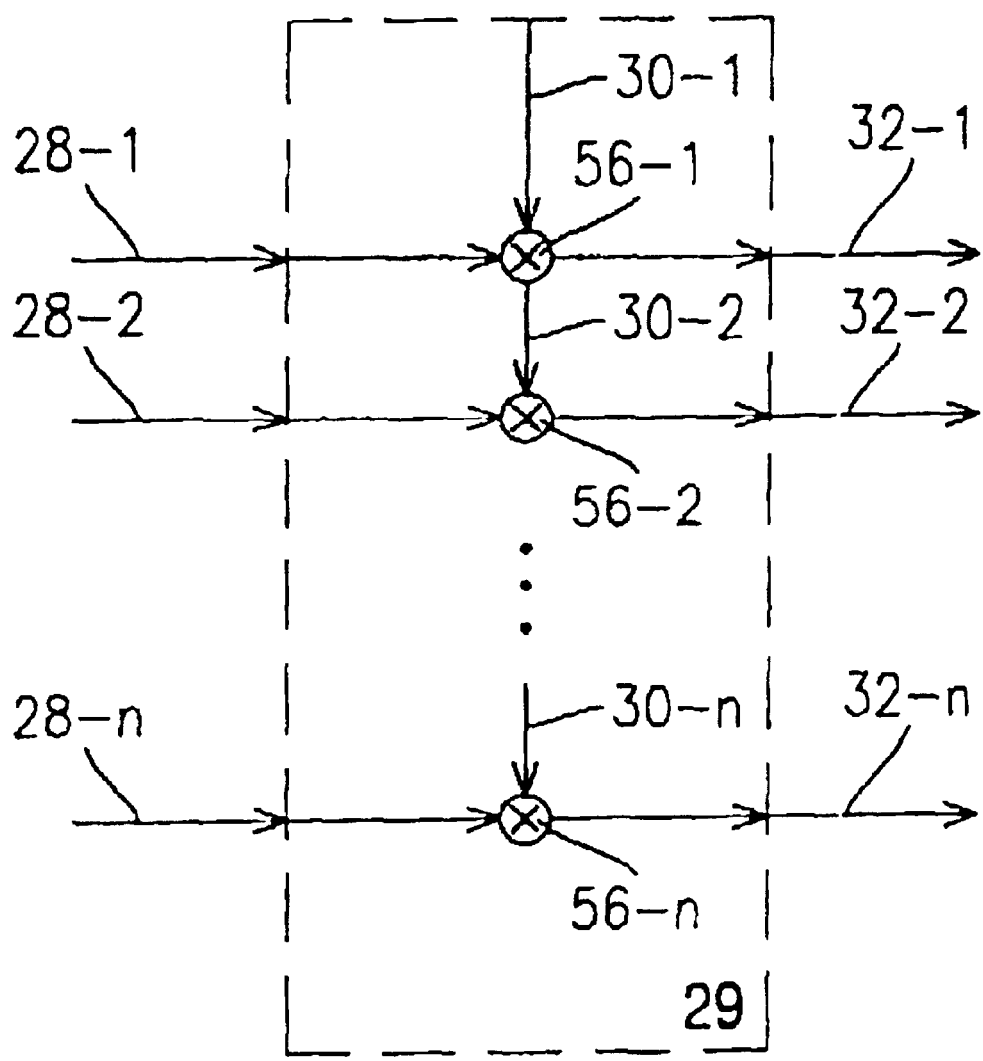
FIG. 3 shows a circuit diagram of a multiplication circuit provided within the transceiver according to the invention.

FIG. 3 shows the circuitry construction of the multiplication circuit 29. The digital tone data output by the FFT transformation circuit 27 are applied via n line 28 to n multiplication circuits 56 within the multiplication circuit 29, where they are multiplied by channel distortion compensation coefficients which are applied to the multiplication circuit 29 by the control circuit 31 via control lines 30-1 to 30-n. The received multitone data of the data reception signal which are weighted in this way are applied via n data lines 32 to the QAM decision circuit 33.

In the idle operating mode of the transceiver 1, the control circuit 31 applies signal coefficients of a first channel distortion compensation coefficient set to the multiplication circuit 29 via the control lines 30. If the control circuit 31 receives from the identification circuit 48, via the line 50, an identification signal indicating that the handset has been taken off-hook by the subscriber, the control circuit 31 changes over the voice signal driver 45 to the working operating mode and simultaneously applies signal coefficients of a second channel distortion compensation coefficient set to the multiplication circuit 29.

The channel coefficients of the first channel distortion compensation coefficient set are determined during a single initialization operation by measurement of the transmission channel 17 and calculation by means of an LMS method by the control circuit 31.

In a first embodiment of the transceiver 1 according to the invention, the control circuit 31 furthermore contains a calculation unit which calculates the coefficients of the second channel distortion compensation coefficient set for the working operating mode as a function of the first channel distortion compensation coefficient set determined during the initialization operation. The coefficients of the two channel distortion compensation coefficient sets are preferably complex coefficients. The channel distortion compensation coefficients of the second channel distortion compensation coefficient set for the working operating mode are preferably higher in each case by a constant complex value than the channel distortion compensation coefficients of the first channel distortion compensation coefficient set for the idle operating mode.

In an alternative embodiment, the control circuit 31 contains a memory device in which are stored at least two different channel coefficient sets for the idle operating mode and the working operating mode.

Figure 4:
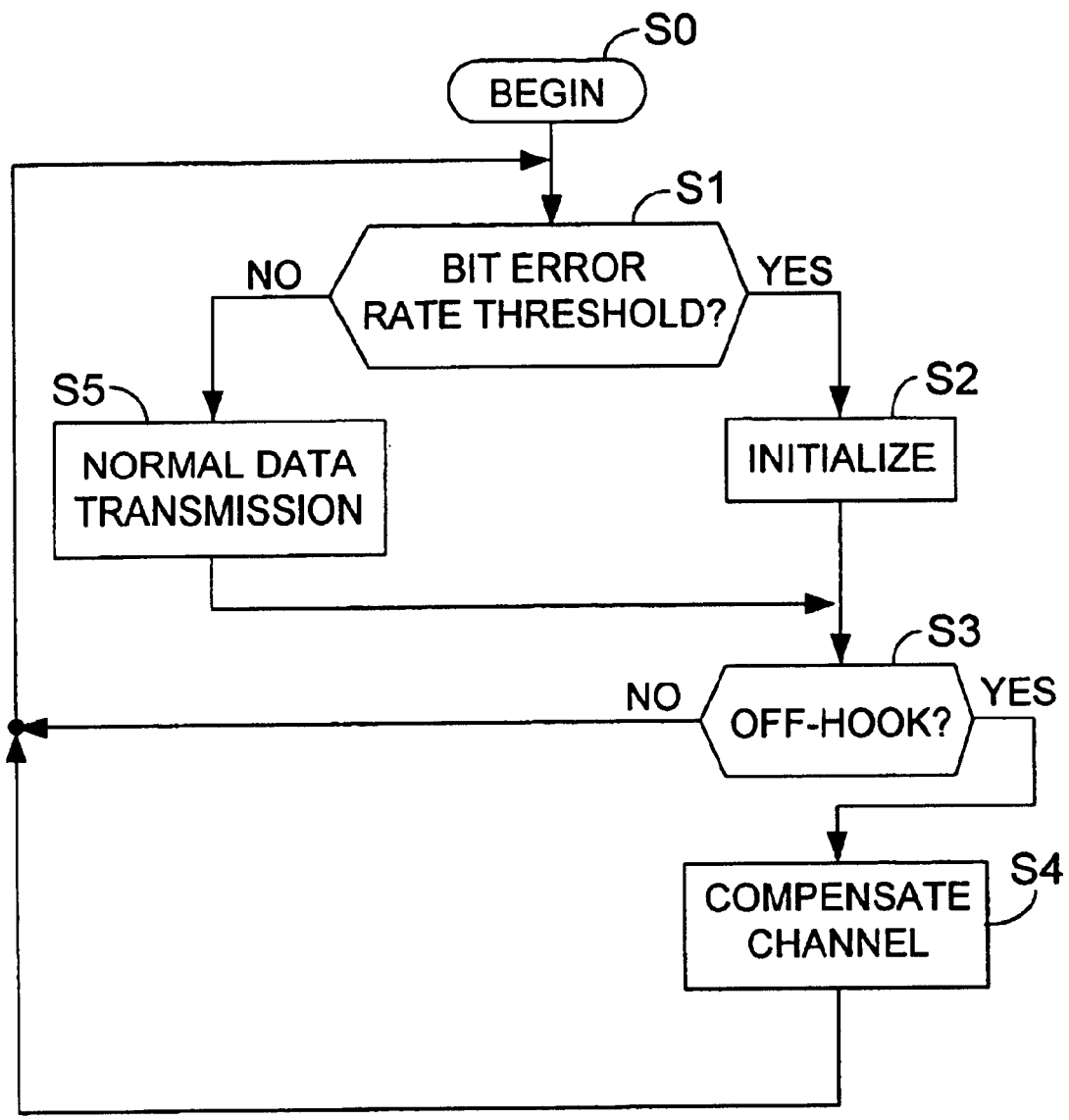
FIG. 4 shows a flow diagram for explaining the method of operation of the transceiver according to the invention which is illustrated in FIG. 2.

FIG. 4 shows a flow diagram for explaining the method of operation of the transceiver 1 which is illustrated in FIG. 2.

After a Step S0, in a Step S1 a check is made to determine whether or not the bit error rate during the data transmission has exceeded a specific threshold value. If the bit error rate is too large, then in a step S2 in a standardized initialization phase, the transmission channel 17 is measured and the channel distortion compensation coefficients for compensating channel distortions of the transmission channel 17 are determined by means of an LMS calculation method.

In a Step S3, the control circuit 31 checks whether or not the subscriber terminal has been taken off-hook by the subscriber. If the subscriber terminal has been taken off-hook, in a Step S4 the coefficients of the second channel distribution compensation coefficient set for the working operating mode are applied to the multiplication circuit 29 by the control circuit 31 in order to compensate the changed transmission properties of the transmission channel 17, said transmission properties having been changed as a result of the output impedance change of the voice signal driver 45. The process subsequently returns to Step S1. As a result of the compensation, the bit error rate decreases and, in a Step S5, the normal data transmission takes place between the transceiver 1 and the terminating subscriber. If it is ascertained in Step S3 that the telephone handset has been placed on-hook again by the terminating subscriber, in Step S4 the original first channel coefficient set for the idle operating mode is set again.

In the transceiver 1 according to the invention, a renewed initialization operation does not have to be carried out when the handset is taken off-hook or placed on-hook by the subscriber, so that the data transmission between the subscriber modem and the transceiver 1 can be continued without interruption. The change in the transmission properties of the transmission channel 17 as a result of the changed output impedance of the voice signal driver 45 in the event of changeover between the two operating modes is compensated by the changeover between the two signal distortion compensating coefficient sets of the control circuit 31.

We claim:

1. A transceiver for transmitting and receiving voice signals and data signals, said transceiver comprising:
a voice signal driver configured to operate in an operating mode selected from
an idle-operating mode, during which the voice signal driver has a high output impedance, and
a working operating-mode, during which the voice signal driver has a low output impedance and is configured to drive an analog transmission voice signal, via a transmission channel, to a subscriber terminal;
a data signal driver for driving an analog data transmission signal via the transmission channel to the subscriber terminal; and
a data reception circuit configured to convert a received analog data reception signal into digital reception data, the data reception circuit including
a multiplication circuit for multiplying the digital reception data by adjustable channel distortion compensation coefficients selected to compensate for channel distortions of the transmission channel, an identification circuit connected to the transmission channel, the identification circuit being configured to output an identification signal indicative of whether the subscriber terminal is taken off-hook or placed on-hook, and a control circuit configured
- to select the operating mode of the voice signal driver in response to the identification signal by switching the voice signal driver into the working operating-mode when the subscriber terminal is taken off-hook and switching the voice signal driver into the idle operating-mode when the subscriber terminal is placed on-hook, and
- to set the channel distortion compensation coefficients to compensate for a change in the transmission channel resulting from a change in the output impedance of the voice signal driver.

2. The transceiver as claimed in claim 1, wherein the data signals are modulated by a discrete modulation method.

3. The transceiver as claimed in claim 1, wherein the control circuit is configured to apply a channel distortion coefficient set on the basis of the operating mode of the voice signal driver.

4. The transceiver of claim 3, wherein the control circuit is configured
- to apply a first set of channel distortion compensation coefficients to the multiplication circuit when the voice signal driver operates in the idle operating-mode, and
- to apply a second set of channel distortion compensation coefficient to the multiplication circuit in the working operating-mode.

5. The transceiver as claimed in claim 1, wherein the control circuit is configured to define a set of channel distortion compensation coefficients that include complex-valued coefficients.

6. The transceiver as claimed in claim 4, wherein the control circuit is configured to offset the channel distortion compensation coefficients of the first and second sets by a constant complex value.

7. The transceiver as claimed in claim 4, wherein the control circuit further comprises a calculation unit for calculating the coefficients of the second set of channel distortion compensation coefficients as a function of the coefficients of the first set of channel distortion compensation coefficients.

8. The transceiver as claimed in claim 4, wherein the control circuit further comprises a memory unit for storing the coefficients of the first and second sets of channel distortion compensation coefficients.

9. The transceiver as claimed in claim 1, wherein further comprising a switching device for selectively connecting and disconnecting the identification circuit from the transmission channel in response to a signal from the control circuit.

10. The transceiver of claim 9, wherein the control circuit is configured to disconnect the identification circuit from the transmission channel when the subscriber terminal is taken off-hook and to connect the identification circuit to the transmission channel when the subscriber terminal is placed on-hook.

11. The transceiver as claimed in claim 1, wherein the transmission channel comprises a telephone subscriber line.

12. The transceiver as claimed in claim 1, wherein the data signals comprise multi-tone signals.

13. The transceiver as claimed in claim 1, further comprising:
- a coder, connected upstream from the data signal driver, for coding the digital transmission data to be transmitted,
- an IFFT transformation calculation circuit, connected upstream from the data signal driver, for IFFT transformation of the digital transmission data, and
- a digital/analog converter, connected upstream from the data signal driver, for converting the transformed digital transmission data into the analog data transmission signal.

14. The transceiver as claimed in claim 1, further comprising
- an analog/digital converter, connected upstream from the multiplication circuit, for converting the analog data reception signal into digital reception data,
- a digital FIR filter having adjustable filter coefficients and being connected upstream from the multiplication circuit, and
- an FFT transformation calculation circuit, connected upstream from the multiplication circuit, for FFT transformation of the filtered digital reception data.

15. The transceiver as claimed in claim 1, further comprising a decoder and a decision circuit, both connected downstream from the multiplication circuit, for decoding the digital reception data.

16. The transceiver as claimed in claim 4, wherein the control circuit is configured to determine the coefficients of the first set by characterizing the transmission channel during an initialization period for initializing the transceiver.

17. The transceiver as claimed in claim 1, wherein the transceiver is an xDSL transceiver.

* * * * *